US007427235B2

(12) United States Patent
Anderson et al.

(10) Patent No.: US 7,427,235 B2
(45) Date of Patent: Sep. 23, 2008

(54) GAMING MACHINE WITH SORTING FEATURE

(75) Inventors: Peter Anderson, Chicago, IL (US); Michael P. Casey, Chicago, IL (US); Erica A. Frohm, Evanston, IL (US); Jason C. Gilmore, Bartlett, IL (US); Damon E Gura, Chicago, IL (US); Darryl W. Hughes, Oak Park, IL (US); Joel R. Jaffe, Evanston, IL (US); Ian M. Simmons, Lisle, IL (US)

(73) Assignee: WMS Gaming Inc., Waukegan, IL (US)

( * ) Notice: Subject to any disclaimer, the term of this patent is extended or adjusted under 35 U.S.C. 154(b) by 84 days.

(21) Appl. No.: 11/481,772

(22) Filed: Jul. 6, 2006

(65) Prior Publication Data

US 2006/0252487 A1 Nov. 9, 2006

Related U.S. Application Data

(63) Continuation of application No. 10/748,770, filed on Dec. 29, 2003, now Pat. No. 7,112,135, which is a continuation of application No. 09/978,755, filed on Oct. 16, 2001, now Pat. No. 6,685,561, which is a continuation of application No. 09/631,322, filed on Aug. 3, 2000, now Pat. No. 6,364,766.

(51) Int. Cl.
*A63F 13/00* (2006.01)

(52) U.S. Cl. .......................................................... 463/16

(58) Field of Classification Search ............... 463/9-13, 463/16-20; 273/272, 292, 138.1, 143 R
See application file for complete search history.

(56) References Cited

U.S. PATENT DOCUMENTS

| | | | | |
|---|---|---|---|---|
| 4,215,864 | A | 8/1980 | Nichols | 273/153 R |
| 4,227,697 | A | 10/1980 | Castanis | 273/272 |
| 4,601,473 | A | 7/1986 | Dubren et al. | 273/272 |
| 4,618,150 | A | 10/1986 | Kimura | 273/138.2 |
| 4,648,600 | A | 3/1987 | Olliges | 463/20 |
| 4,743,024 | A | 5/1988 | Helm et al. | 273/138.2 |
| 4,756,532 | A | 7/1988 | Kamille | 273/153 R |
| 5,123,649 | A | 6/1992 | Tiberio | 273/143 R |
| 5,195,753 | A | 3/1993 | Brukl et al. | 273/429 |
| 5,203,705 | A | 4/1993 | Hardy et al. | 434/169 |
| 5,393,057 | A | 2/1995 | Marnell, II | 273/269 |

(Continued)

OTHER PUBLICATIONS

Atronic Casino Technology Brochure, pp. 1-4 (1995).
Jumble™That Scrambled Word Game, jumble.com, pp. 1-4 (2000).

*Primary Examiner*—Scott E Jones

(74) *Attorney, Agent, or Firm*—Nixon Peabody LLP

(57) ABSTRACT

A gaming machine comprises at least one visual display (mechanical or video) and a game of chance controlled by a processor in response to a wager. The game of chance includes a primary game and a sorting feature. The sorting feature is triggered by certain start-feature outcomes of the primary game. The sorting feature includes a collection of scrambled objects, such as letters, symbols, pictures, or puzzle pieces, that are at least partially sorted during operation of the sorting feature. The sorting feature generates an award, such as a payoff, a payoff multiplier, or extended play, if the sorted objects match predetermined criteria.

24 Claims, 10 Drawing Sheets

U.S. PATENT DOCUMENTS

| | | | | |
|---|---|---|---|---|
| 5,704,835 | A | 1/1998 | Dietz, II | 463/20 |
| 5,743,798 | A | 4/1998 | Adams et al. | 463/17 |
| 5,788,573 | A | 8/1998 | Baerlocher et al. | 273/138.2 |
| 5,816,918 | A | 10/1998 | Kelly et al. | 463/16 |
| 5,848,932 | A | 12/1998 | Adams | 463/20 |
| 5,860,653 | A | 1/1999 | Jacobs | 273/272 |
| 5,935,002 | A | 8/1999 | Falciglia | 463/19 |
| 5,947,820 | A | 9/1999 | Morro et al. | 463/9 |
| 5,951,397 | A | 9/1999 | Dickinson | 463/36 |
| 5,980,384 | A | 11/1999 | Barrie | 463/16 |
| 6,033,306 | A | 3/2000 | De Souza | 463/18 |
| 6,059,289 | A | 5/2000 | Vancura | 273/143 R |
| 6,089,975 | A | 7/2000 | Dunn | 463/16 |
| 6,089,976 | A | 7/2000 | Schneider et al. | 463/16 |
| 6,102,798 | A | 8/2000 | Bennett | 463/16 |
| 6,135,885 | A | 10/2000 | Lermusiaux | 463/20 |
| 6,162,121 | A | 12/2000 | Morro et al. | 463/16 |
| 6,174,235 | B1 | 1/2001 | Walker et al. | 463/25 |
| 6,346,043 | B1 | 2/2002 | Colin et al. | 463/17 |
| 6,364,766 | B1 * | 4/2002 | Anderson et al. | 463/16 |
| 6,428,412 | B1 | 8/2002 | Anderson et al. | 463/16 |
| 6,685,561 | B2 * | 2/2004 | Anderson et al. | 463/16 |
| 6,796,899 | B2 | 9/2004 | Baerlocher | 463/17 |
| 7,112,135 | B2 * | 9/2006 | Anderson et al. | 463/16 |

* cited by examiner

13

12

12

13

GAMING MACHINE WITH SORTING FEATURE

CROSS REFERENCE TO RELATED APPLICATIONS

This application is a continuation of U.S. patent application Ser. No. 10/748,770, filed Dec. 29, 2003, now allowed as U.S. Pat. No. 7,112,135, which issued on Sept. 26, 2006, which is a continuation of U.S. patent application Ser. No. 09/978,755, filed Oct. 16, 2001, and issued as U.S. Pat. No. 6,685,561 B2 on Feb. 3, 2004; which is a continuation of U.S. patent application Ser. No. 09/631,322, filed Aug. 3, 2000, and issued as U.S. Pat. No. 6,364,766 on Apr. 2, 2002.

FIELD OF THE INVENTION

The present invention relates generally to gaming machines and, more particularly, to a gaming machine including a sorting feature in which a collection of scrambled objects, such as letters, symbols, pictures, or puzzle pieces, are sorted to some extent.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome of the basic game. Because the bonus game concept offers tremendous advantages in player appeal and excitement relative to other known games, and because such games are attractive to both players and operators, there is a continuing need to develop new features for bonus games to satisfy the demands of players and operators. Preferably, such new bonus game features will maintain, or even further enhance, the level of player excitement offered by bonus games heretofore known in the art. The present invention is directed to satisfying these needs.

SUMMARY OF THE INVENTION

A gaming machine comprises at least one visual display (mechanical or video) and a game of chance controlled by a processor in response to a wager. The game of chance includes a primary game and a sorting feature. The sorting feature is triggered by certain start-feature outcomes of the primary game. The sorting feature includes a collection of scrambled objects, such as letters, symbols, pictures, or puzzle pieces, that are at least partially sorted during operation of the sorting feature. The sorting feature generates an award, such as a payoff, a payoff multiplier, or extended play, if the sorted objects match predetermined criteria.

In one embodiment, the primary game includes a plurality of rotatable reels that are rotated and stopped to place symbols on each reel in visual association with at least one pay line. The reels may be mechanical or images shown on a video screen.

The collection of scrambled objects may be displayed in a string, a two-dimensional array, or a three-dimensional array and, when fully sorted, may form a word, a picture, a shape, a geometrical sequence, etc. In one embodiment, the collection of scrambled objects is a string of scrambled letters of the alphabet. When fully sorted, the letters form a word.

BRIEF DESCRIPTION OF THE DRAWINGS

The foregoing and other advantages of the invention will become apparent upon reading the following detailed description and upon reference to the drawings in which.

Figure 1:
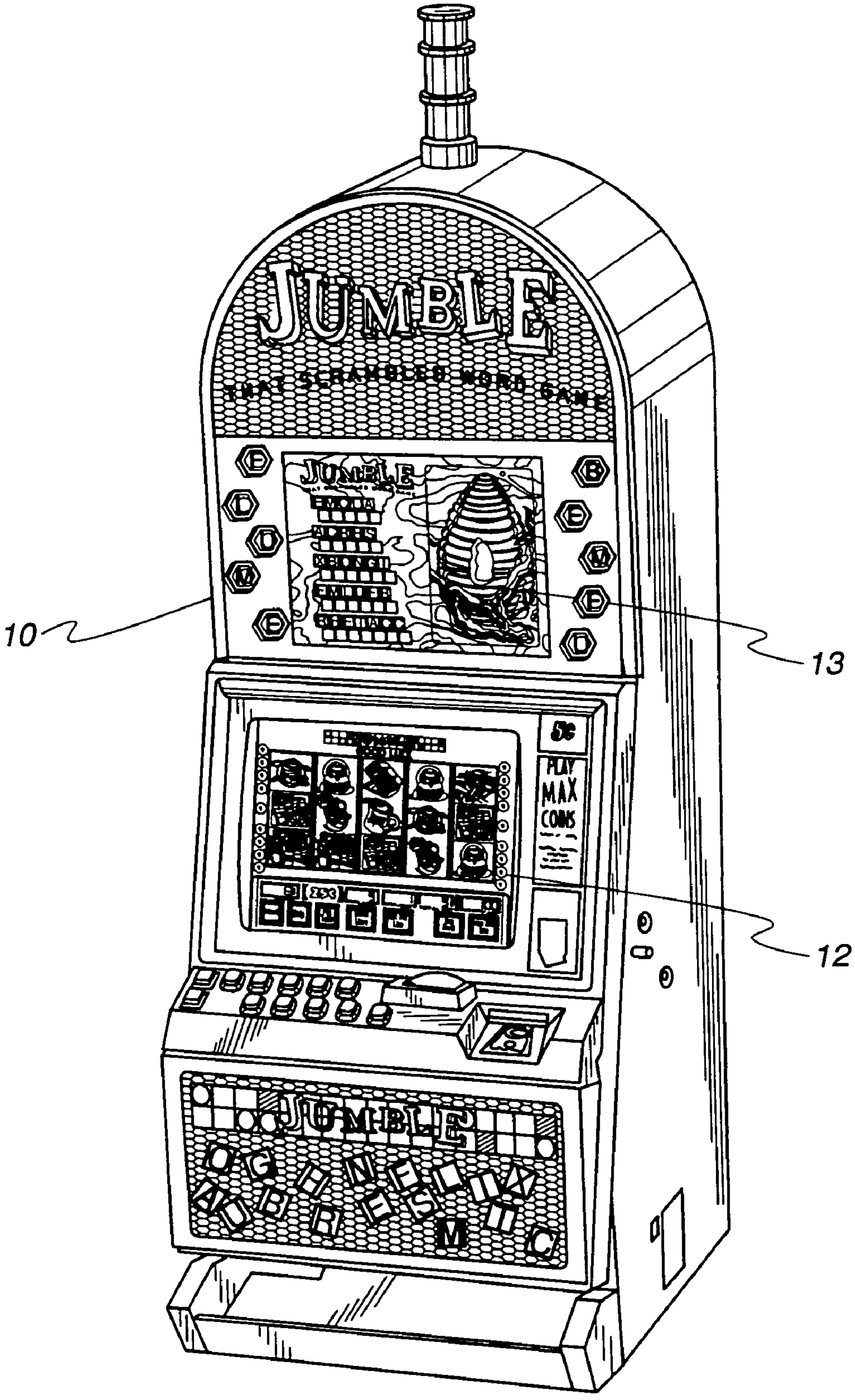
FIG. 1 is a simplified front view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is depicted a gaming machine 10 that may be used to implement a bonus game according to the present invention. The gaming machine 10 includes lower and upper visual displays 12 and 13 in the form of a dot matrix, CRT, LED, LCD, electro-luminescent, mechanical, or other type of display known in the art. In the illustrated embodiment, the gaming machine 10 is an "upright" version in which the visual displays 12 and 13 are video displays oriented vertically relative to the player and the lower display 12 includes a touch screen. Alternatively, the gaming machine may be a "slant-top" version in which the lower display 12 is slanted at about a thirty-degree angle toward the player.

In one embodiment, the gaming machine 10 is operable to play a game of chance entitled JUMBLE™ having a JUMBLE puzzle game theme. The JUMBLE game features a basic slot game with five simulated spinning reels and bonus games with strings of scrambled letters of the alphabet. It will be appreciated, however, that the gaming machine 10 may be implemented with games other than the JUMBLE™ game and/or with any of several alternative game themes.

Figure 2:
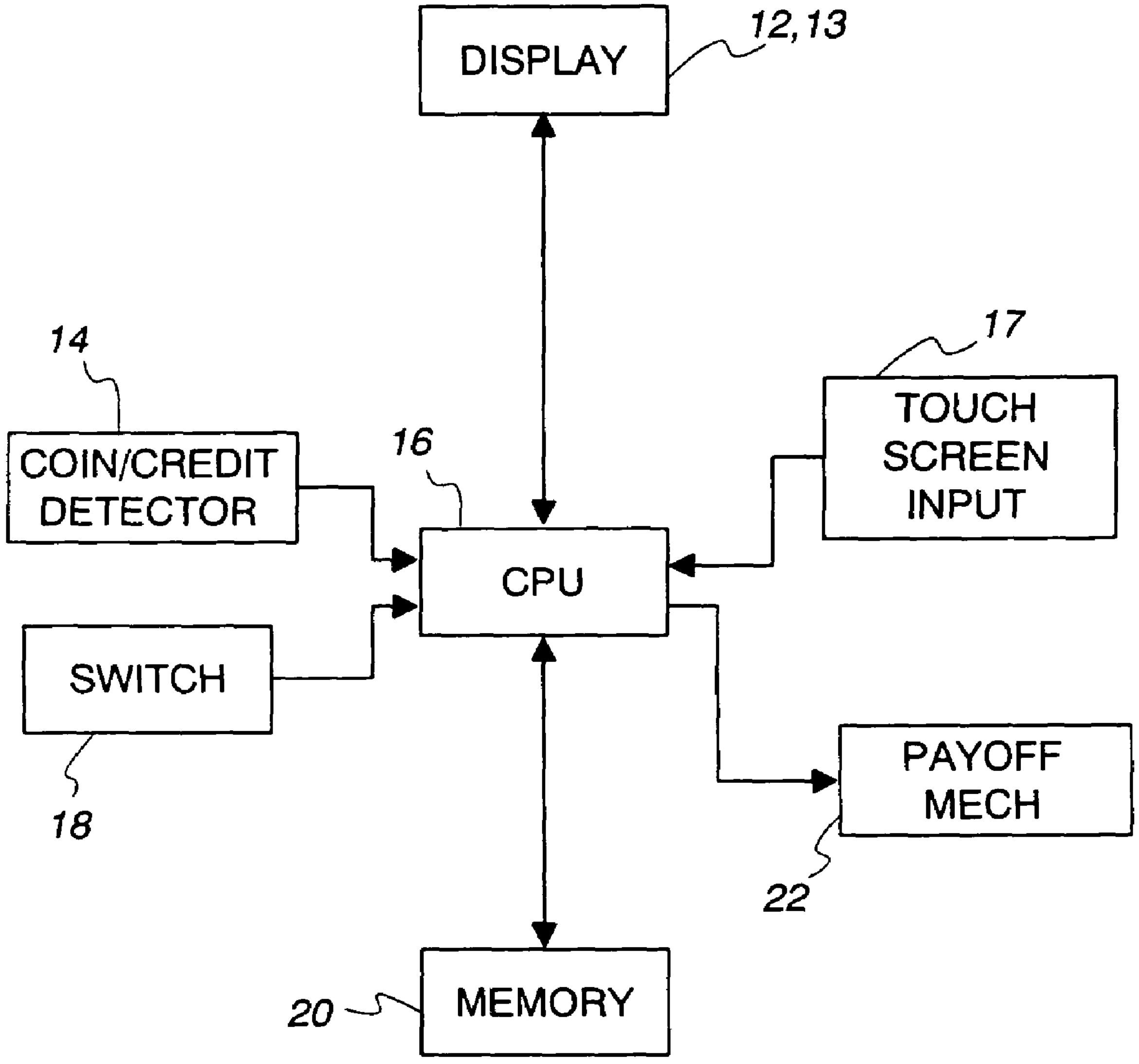
FIG. 2 is a block diagram of a control system suitable for operating the gaming machine.

FIG. 2 is a block diagram of a control system suitable for operating the gaming machine 10. Coin/credit detector 14 signals a central processing unit (CPU) 16 when a player has inserted a number of coins or played a number of credits. Then, the CPU 16 operates to execute a game program that causes the video display 12 to display the basic game that includes simulated symbol-bearing reels. The player may select the number of pay lines to play and the amount to wager via touch screen input keys 17. The basic game commences in response to the player activating a switch 18 (e.g., by pulling a lever or pushing a button), causing the CPU 16 to set the reels in motion, randomly select a game outcome and then stop the reels to display symbols corresponding to the pre-selected game outcome. In one embodiment, certain of the basic game outcomes cause the CPU 16 to enter a bonus mode causing one or both of the video displays 12 and 13 to show some type of bonus game. Different basic game outcomes trigger different bonus games. The display screens associated with the JUMBLE™ bonus games are described in detail below in relation to FIGS. 3 through 18.

A system memory 20 stores control software, operational instructions and data associated with the gaming machine 10. In one embodiment, the memory 20 comprises a separate read-only memory (ROM) and battery-backed random-access memory (RAM). However, it will be appreciated that the system memory 20 may be implemented on any of several alternative types of memory structures or may be implemented on a single memory structure. A payoff mechanism 22 is operable in response to instructions from the CPU 16 to award a payoff of coins or credits to the player in response to certain winning outcomes which might occur in the basic game or bonus game. The payoff amounts corresponding to certain combinations of symbols in the basic game is predetermined according to a pay table stored in system memory 20. The payoff amounts corresponding to certain outcomes of the bonus game are also stored in system memory 20.

Figure 3:
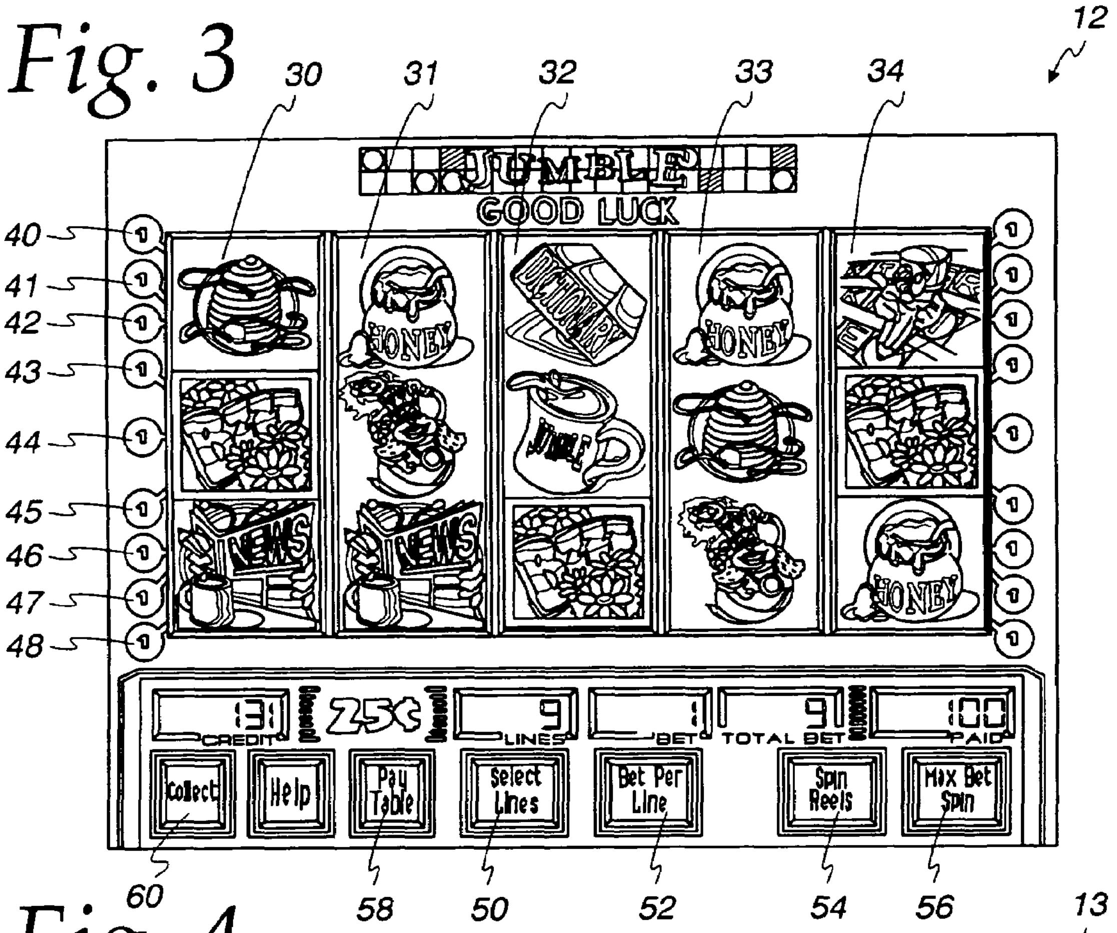
FIG. 3 is a display screen capture showing a start-bonus outcome including three scattered BZZZ symbols on the reels of a five-reel, nine-line basic game played on the gaming machine.

As shown in FIG. 3, the JUMBLE™ basic game is implemented on the video display 12 on five video simulated spinning reels 30, 31, 32, 33 and 34 (hereinafter "reels") with nine pay lines 40-48. Each of the pay lines 40-48 extends through one symbol on each of the five reels 30-34. Generally, game play is initiated by inserting a number of coins or playing a number of credits, causing the CPU 16 (FIG. 2) to activate a number of pay lines corresponding to the number of coins or credits played. In one embodiment, the player selects the number of pay lines (between one and nine) to play by pressing a "Select Lines" key 50 on the video display 12. The player then chooses the number of coins or credits to bet on the selected pay lines by pressing the "Bet Per Line" key 52.

After activation of the pay lines, the reels 30-34 may be set in motion by touching the "Spin Reels" key 54 or, if the player wishes to bet the maximum amount per line, by using the "Max Bet Spin" key 56 on the video display 12. Alternatively, other mechanisms such as, for example, a lever or push button may be used to set the reels in motion. The CPU 16 uses a random number generator to select a game outcome (e.g., "basic" game outcome) corresponding to a particular set of reel "stop positions." The CPU 16 then causes each of the video reels 30-34 to stop at the appropriate stop position. Video symbols are displayed on the reels 30-34 to graphically illustrate the reel stop positions and indicate whether the stop positions of the reels represent a winning game outcome. Winning basic game outcomes (e.g., symbol combinations resulting in payment of coins or credits) are identifiable to the player by a pay table. In one embodiment, the pay table is affixed to the machine 10 and/or displayed by the video display 12 in response to a command by the player (e.g., by pressing the "Pay Table" button 58). A winning basic game outcome occurs when the symbols appearing on the reels 30-34 along an active pay line correspond to one of the winning combinations on the pay table. If the displayed symbols stop in a winning combination, the game credits the player an amount corresponding to the award in the pay table for that combination multiplied by the amount of credits bet on the winning pay line. The player may collect the amount of accumulated credits by pressing the "Collect" button 60.

An example of a pay table for the JUMBLE™ basic game is shown below:

| WIN COMBINATIONS | | | | | PAY |
|---|---|---|---|---|---|
| Honeypot | Honeypot | Honeypot | Honeypot | Honeypot | 3000 |
| Honeypot | Honeypot | Honeypot | Honeypot | | 500 |
| Honeypot | Honeypot | Honeypot | | | 100 |
| Tiles | Tiles | Tiles | Tiles | Tiles | 1000 |
| Tiles | Tiles | Tiles | Tiles | | 300 |
| Tiles | Tiles | Tiles | | | 75 |
| Pencil | Pencil | Pencil | Pencil | Pencil | 750 |
| Pencil | Pencil | Pencil | Pencil | | 150 |
| Pencil | Pencil | Pencil | | | 50 |
| Dictionary | Dictionary | Dictionary | Dictionary | Dictionary | 350 |
| Dictionary | Dictionary | Dictionary | Dictionary | | 100 |
| Dictionary | Dictionary | Dictionary | | | 30 |
| Paper | Paper | Paper | Paper | Paper | 200 |
| Paper | Paper | Paper | Paper | | 50 |
| Paper | Paper | Paper | | | 12 |
| *Coffee Mug | Coffee Mug | Coffee Mug | Coffee Mug | Coffee Mug | 125 |
| Coffee Mug | Coffee Mug | Coffee Mug | Coffee Mug | | 30 |
| Coffee Mug | Coffee Mug | Coffee Mug | | | 10 |
| Hive | Hive | Hive | Hive | Hive | 80 |
| Hive | Hive | Hive | Hive | | 25 |
| Hive | Hive | Hive | | | 5 |

The pay table enables the player to view the winning combinations and their associated payoff amounts. From the pay table it can be seen that the following reel symbols can lead to a payoff in the basic game: HONEYPOT, TILES, PENCIL, DICTIONARY, PAPER, COFFEE MUG, and HIVE. The game optionally employs a WILD symbol that is wild for each of the above symbols, but is not wild for any symbols (e.g., BZZZ, QUEEN BEE, JU, MB, and LE) used to trigger the JUMBLE bonus games. In a preferred implementation, the winning combinations start from the first reel 30 (left to right) and span adjacent reels. In an alternative implementation, the winning combinations start from either the first reel 30 (left to right) or the fifth reel 34 (right to left) and span adjacent reels.

Included among the plurality of basic game outcomes are a plurality of different start-bonus outcomes for starting play of different bonus games. A start-bonus outcome may be defined in any number of ways. For example, a start-bonus outcome occurs when a special start-bonus symbol or a special combination of symbols appears on one or more of the reels 30-34 in any predetermined display position. The appearance of a start-bonus outcome causes the processor to shift operation from the basic game to an associated bonus game.

The JUMBLE game preferably includes two different bonus games, namely a letter swap bonus game and a pick-and-solve bonus game.

Figure 4:
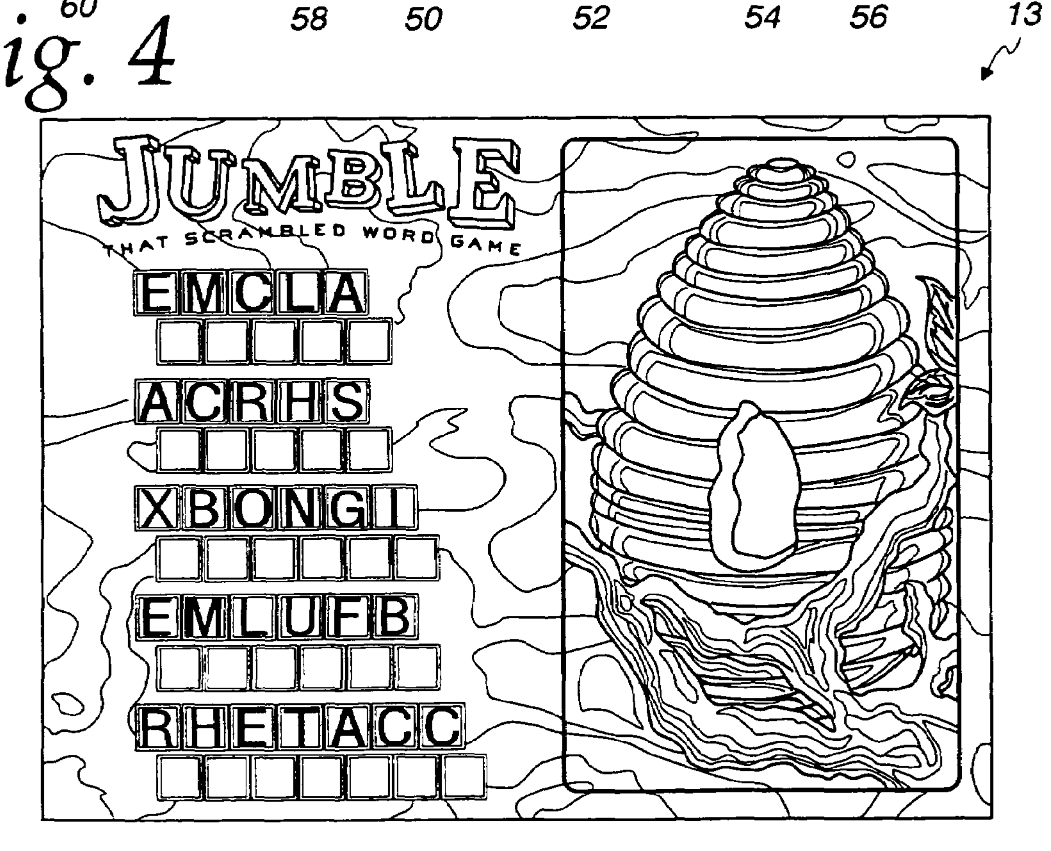
FIGS. 4, 5, and 6 are display screen captures showing a swap bonus game triggered by the start-bonus outcome in FIG. 3.
Figure 5:
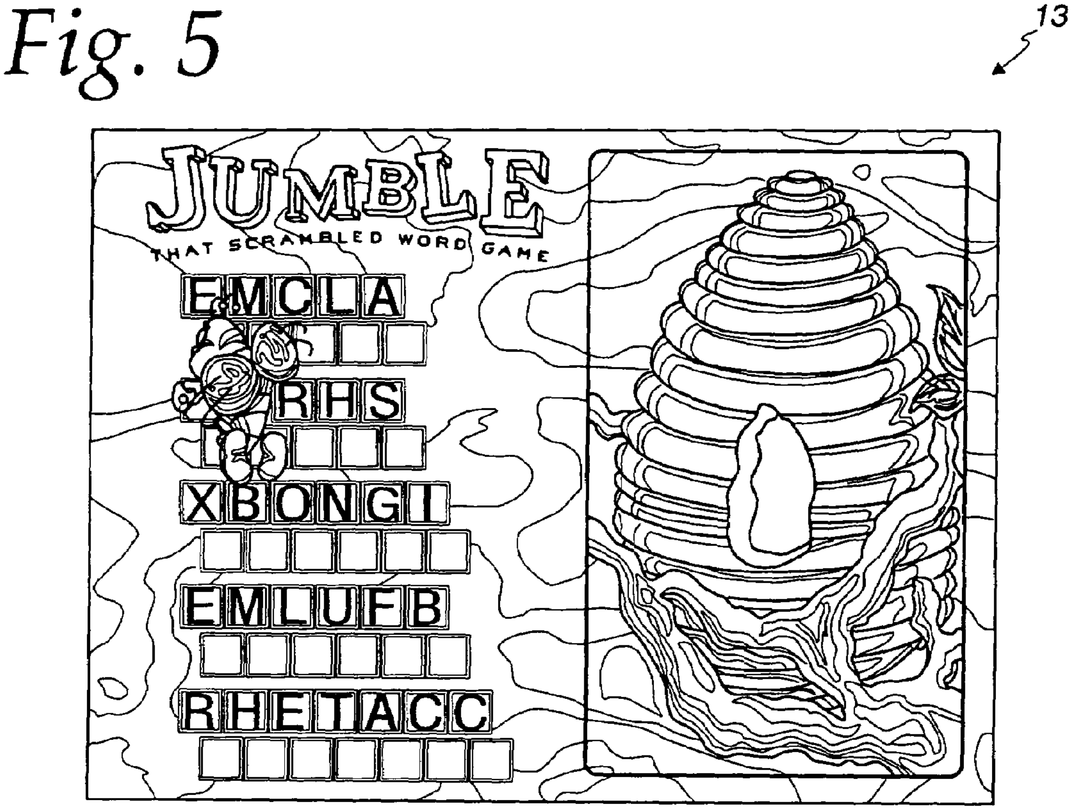
Figure 6:
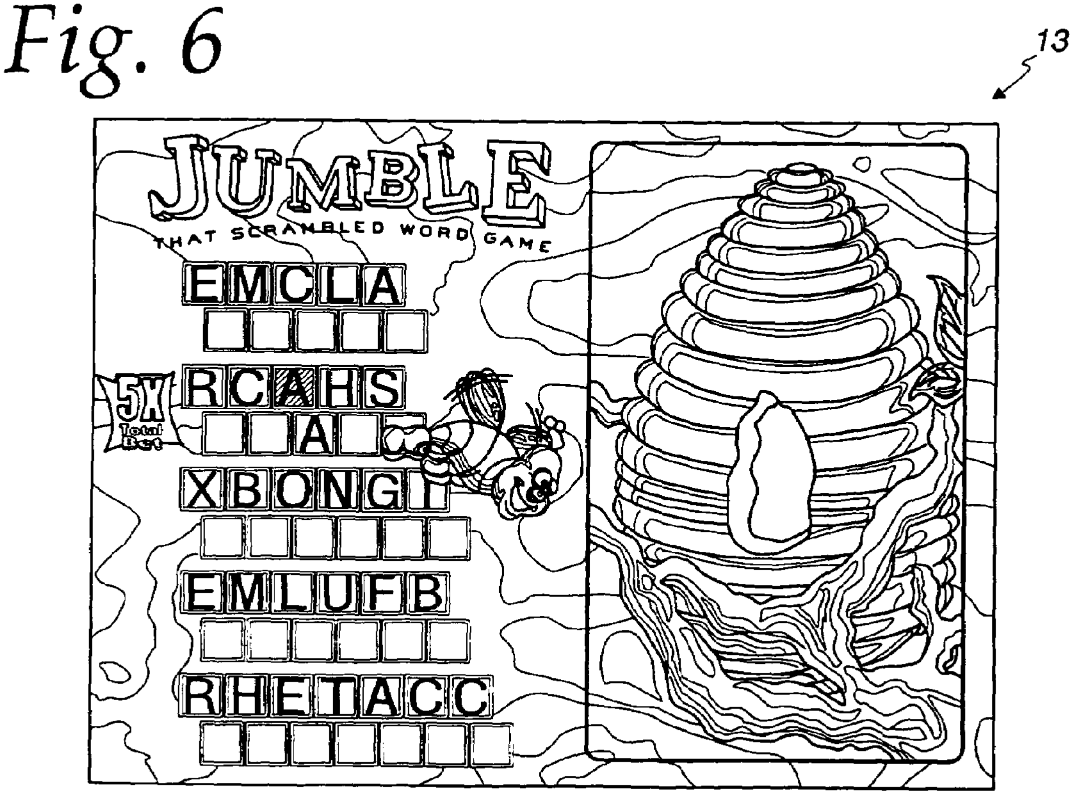

The letter swap bonus game is triggered by two different start-bonus outcomes. First, the swap bonus game can be triggered by three scattered BZZZ symbols in any position on any reels, whether or not the BZZZ symbols are on an active pay line. FIG. 3, for example, illustrates the BZZZ symbols on the middle of the first reel 30, the bottom of the third reel 32, and the middle of the fifth reel 34. In response this start-bonus outcome, the display 13 depicts a worker bee that flies out of a hive to one of five scrambled words. In FIG. 4, for example, the worker bee has selected the scrambled word ACRHS, which is CRASH when unscrambled. The worker bee then selects two letters to swap in the scrambled word. In FIG. 5, the worker bee swaps the letters R and A of the scrambled word ACRHS. The swap bonus game is programmed so that one or both of the swapped letters are placed in the correct position for unscrambling the word. If a letter is placed in the correct position as a result of a swap, that letter is then placed in the bottom row immediately beneath the selected scrambled word and the letter in the top row is "grayed" out to indicate that it cannot be swapped. A bonus in the form of a multiplier is awarded for each correct letter. The multiplier multiplies the player's total wager. In FIG. 6, the letter A is placed in the correct position as a result of the swap and, therefore, this letter has been placed in the bottom row immediately beneath the scrambled word ACRHS and have been grayed out in the top row. A multiplier of 5× has been awarded for the correctly placed letter. If the player's total wager was 9 credits, the player would be awarded 9×5 or 45 credits. If the swapping of letters also solves (i.e., fully sorts/unscrambles) the word, a word completion bonus in the form of a payoff is also awarded. The completed word is replaced with a new scrambled word. Following the completion of one round of the swap bonus game, the processor shifts operation back to the basic game. Changes in the scrambled words produced by one round of the swap bonus game are carried over to subsequent rounds of the swap bonus game.

Figure 7:
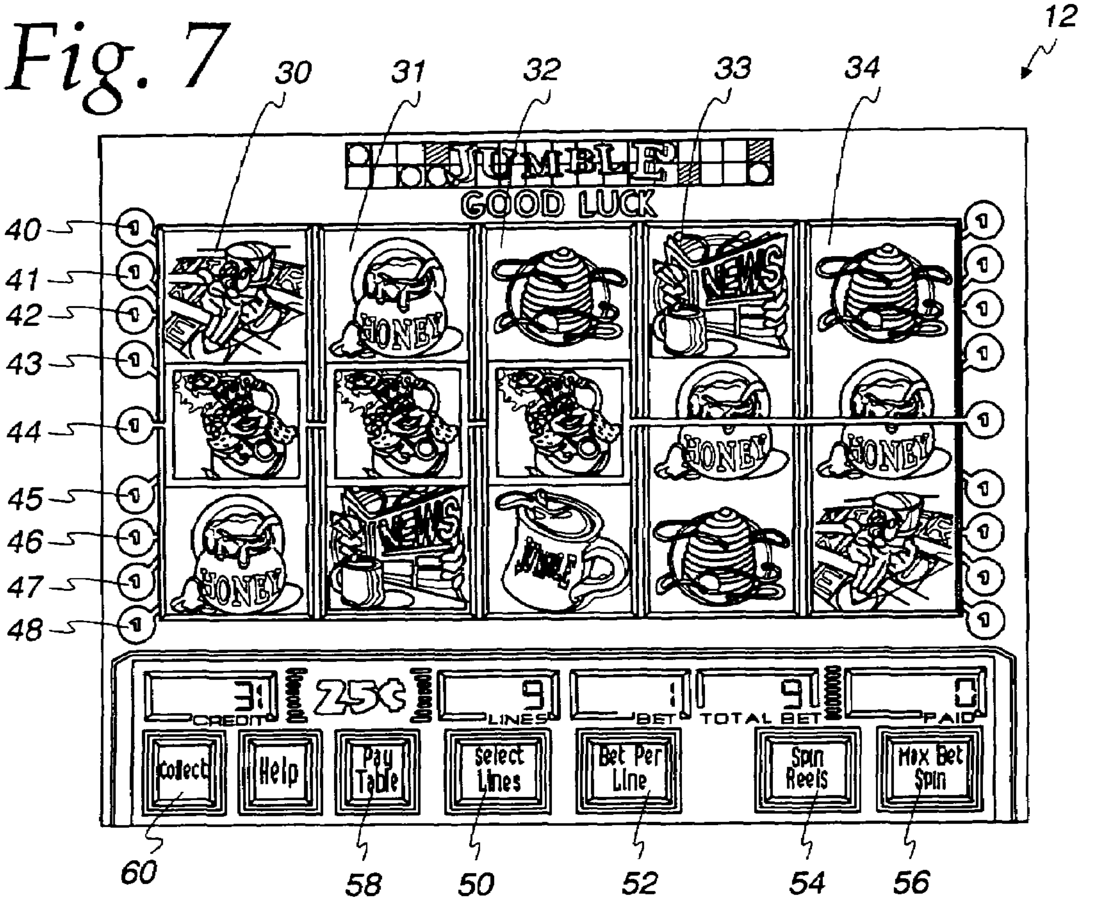
FIG. 7 is a display screen capture showing a start-bonus outcome including three QUEEN BEE symbols along an active pay line on the reels of the basic game played on the gaming machine.
Figure 8:
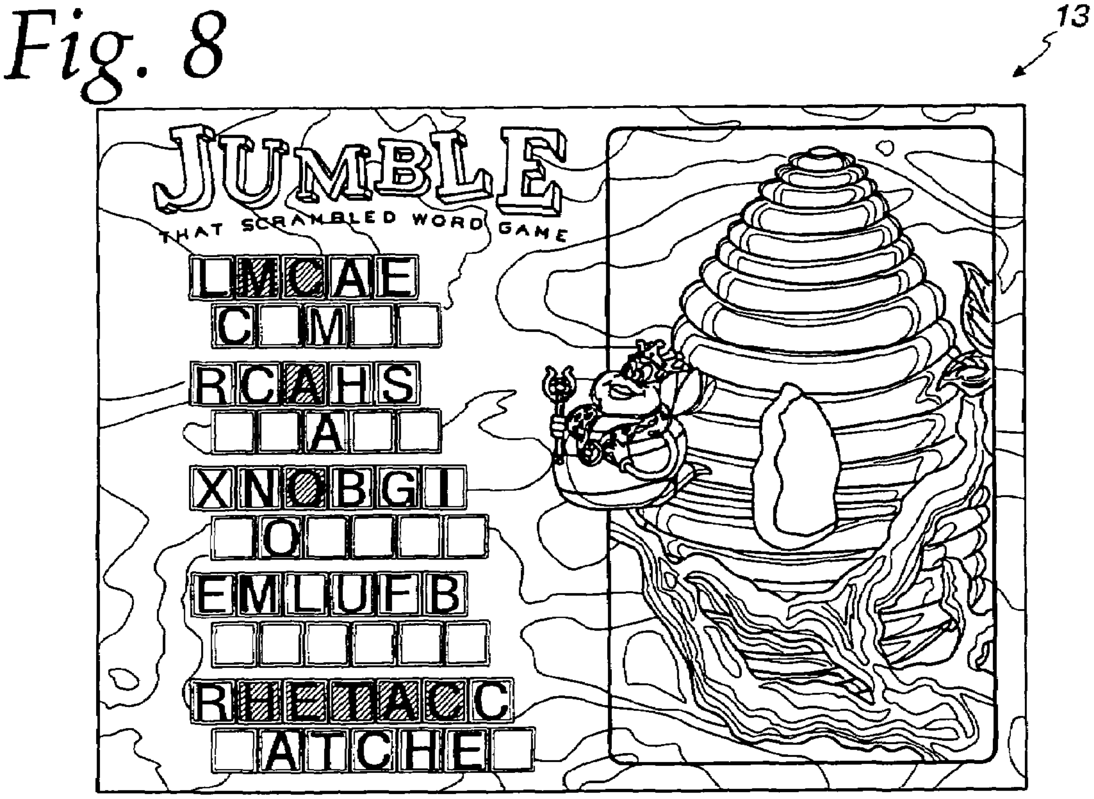
FIGS. 8, 9, 10, and 11 are display screen captures showing the swap bonus game triggered by the start-bonus outcome in FIG. 7.
Figure 9:
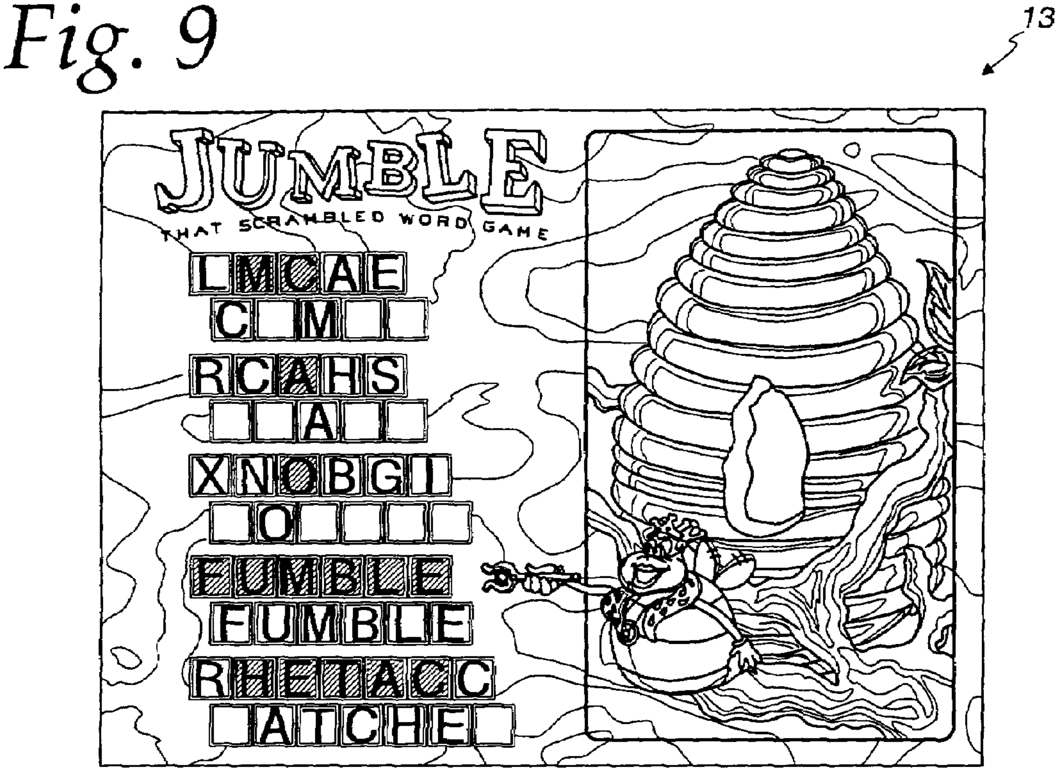

Second, the swap bonus game can be triggered by at least three QUEEN BEE symbols along an active pay line. FIG. 7, for example, illustrates three QUEEN BEE symbols along the pay line 44 extending through the middle symbol on each of the reels 30-34. In response to this start-bonus outcome, the display 13 depicts a queen bee that flies out of the hive as depicted in FIG. 8 and randomly selects one of the five scrambled words to solve. In a preferred embodiment, the queen bee always solves the selected word. The queen bee then solves the selected word by unscrambling all of its letters. The solved word is then placed in the bottom row immediately beneath the selected scrambled word and the selected word in the top row is "grayed" out to indicate that it has been solved. In FIG. 9, for example, the queen bee has selected and solved the scrambled word EMLUFB, which is FUMBLE when unscrambled. A word completion bonus in the form of a payoff is awarded for the solved word. No additional bonus is awarded for the unscrambled letters. The queen bee then returns to the hive. The completed word is replaced with a new scrambled word. Following the completion of one round of the swap bonus game, the processor shifts operation back to the basic game. Changes in the scrambled words produced by one round of the swap bonus game are carried over to subsequent rounds of the swap bonus game.

Figure 10:
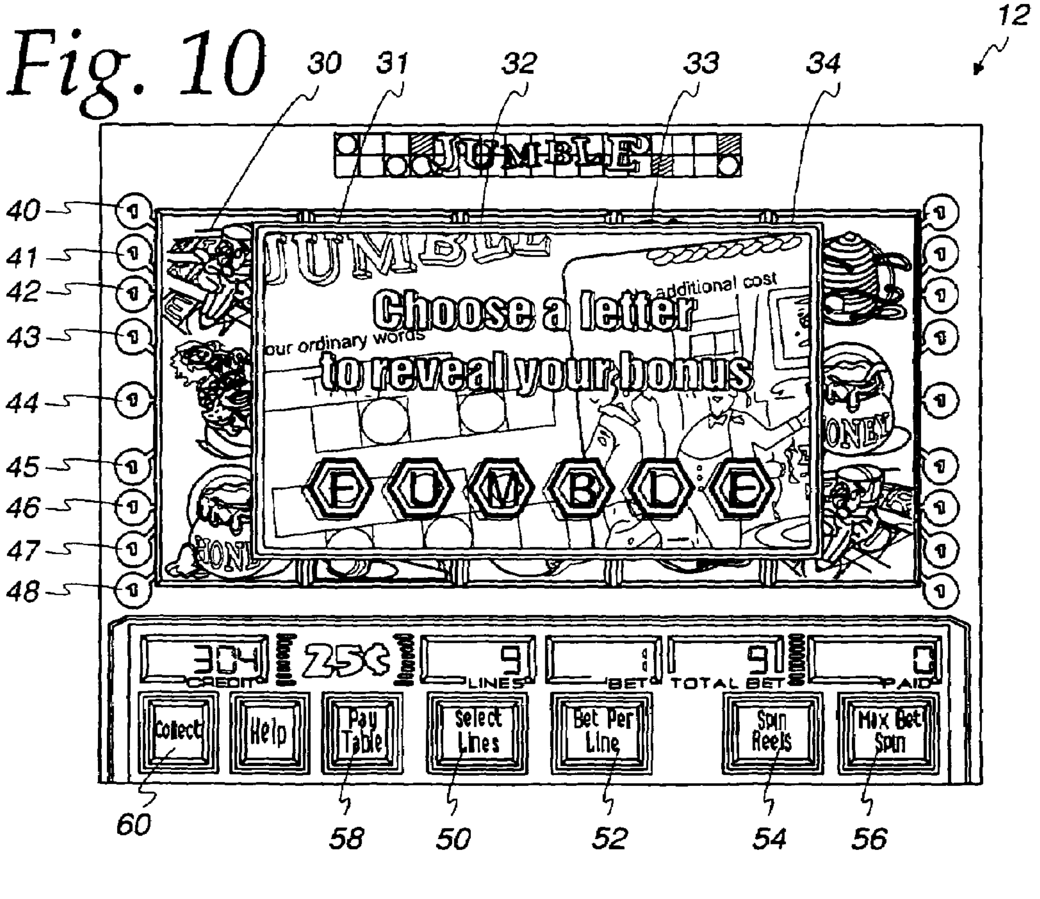
Figure 11:
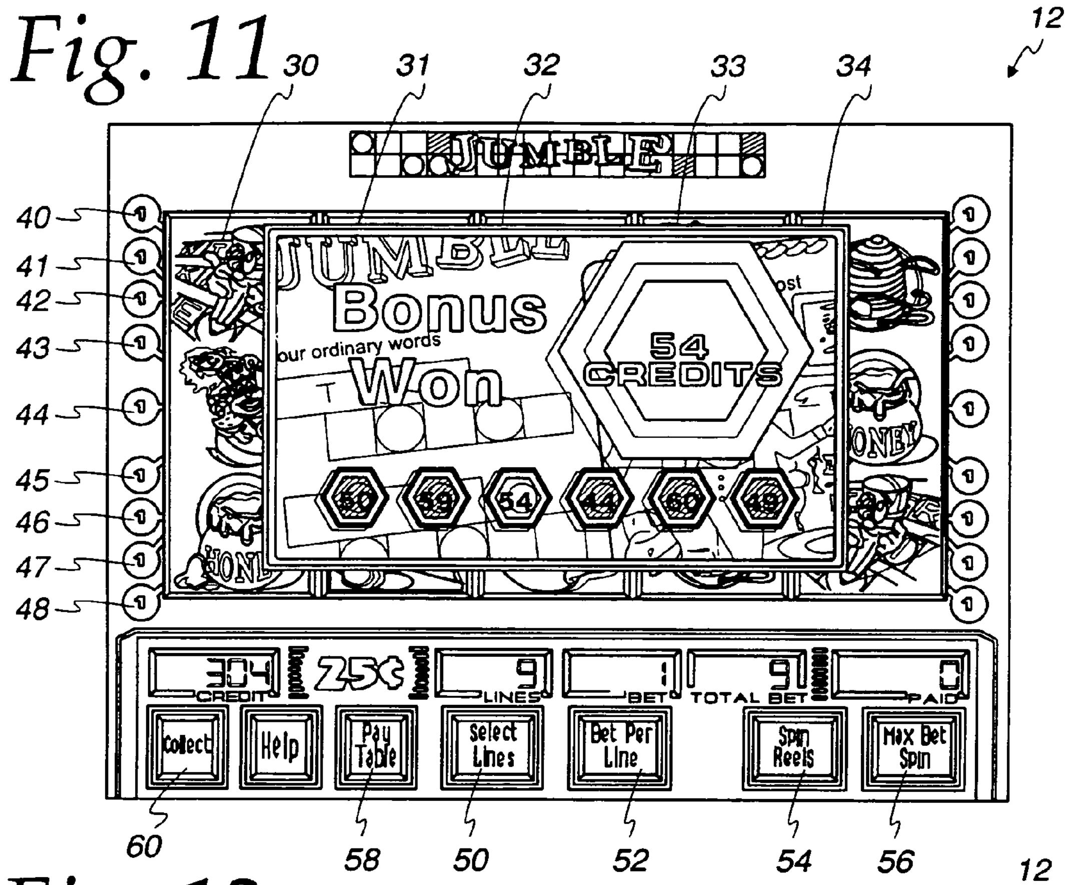

When a word is solved in the swap bonus game, whether triggered by three scattered BZZZ symbols or three QUEEN BEE symbols along an active pay line, a word completion bonus is awarded. A window containing the solved word appears on the lower display 12. The game then prompts the player to select one of the letters of the completed word to reveal a mystery word bonus. After the game awards the mystery word bonus, a new scrambled word replaces the previously solved word on the upper display 13. In FIG. 10, for example, a window containing the solved word FUMBLE appears on the display 12. In response to the letter M being selected by the player, e.g., by touching the touch screen over that letter, a payoff of 54 credits has been awarded in FIG. 11. The awarded payoff is preferably in direct proportion to the line bet. Therefore, the greater the line bet, the greater the awarded payoff. The value of the letters placed by the queen bee are preferably higher than the letters placed by the working bee. Therefore, the same letter of a completed word will reveal a higher mystery word bonus in the swap bonus game triggered by the QUEEN BEE symbols than in the swap bonus game triggered by the BZZZ symbols.

Figure 12:
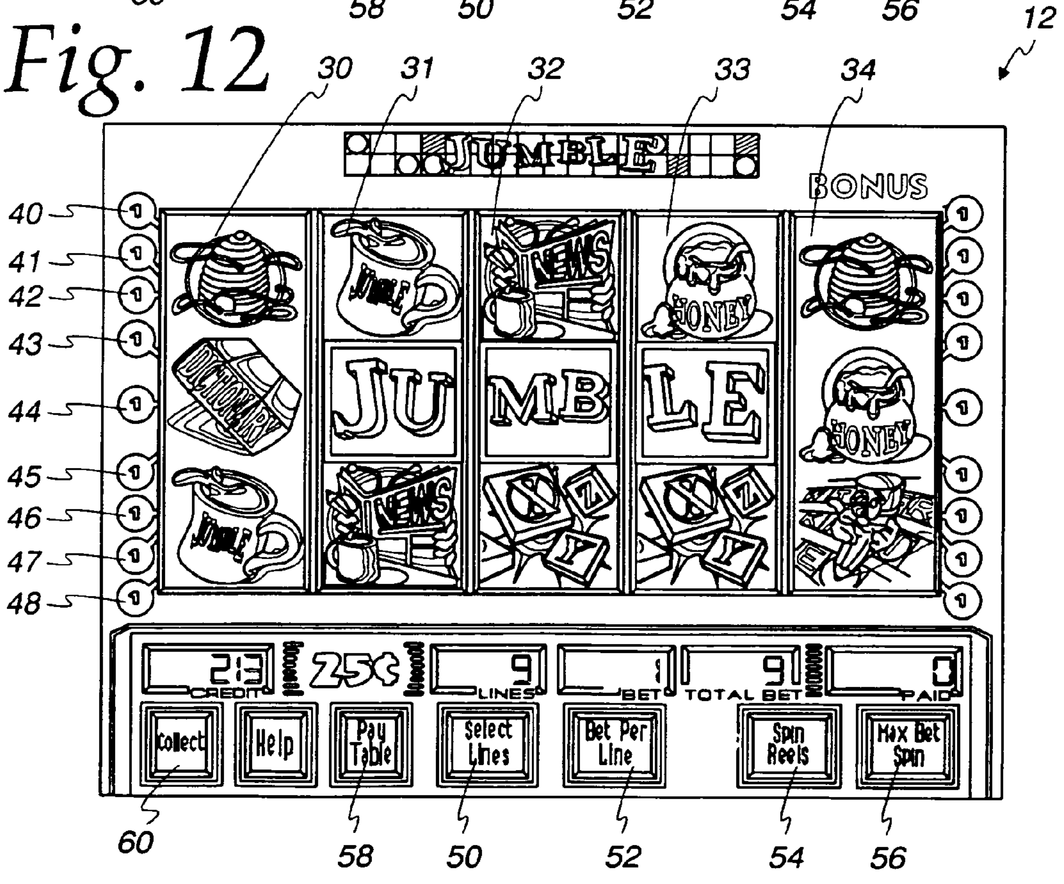
FIG. 12 is a display screen capture showing a start-bonus outcome including the symbols JU, MB, and LE horizontally across adjacent reels of the basic game played on the gaming machine.
Figure 13:
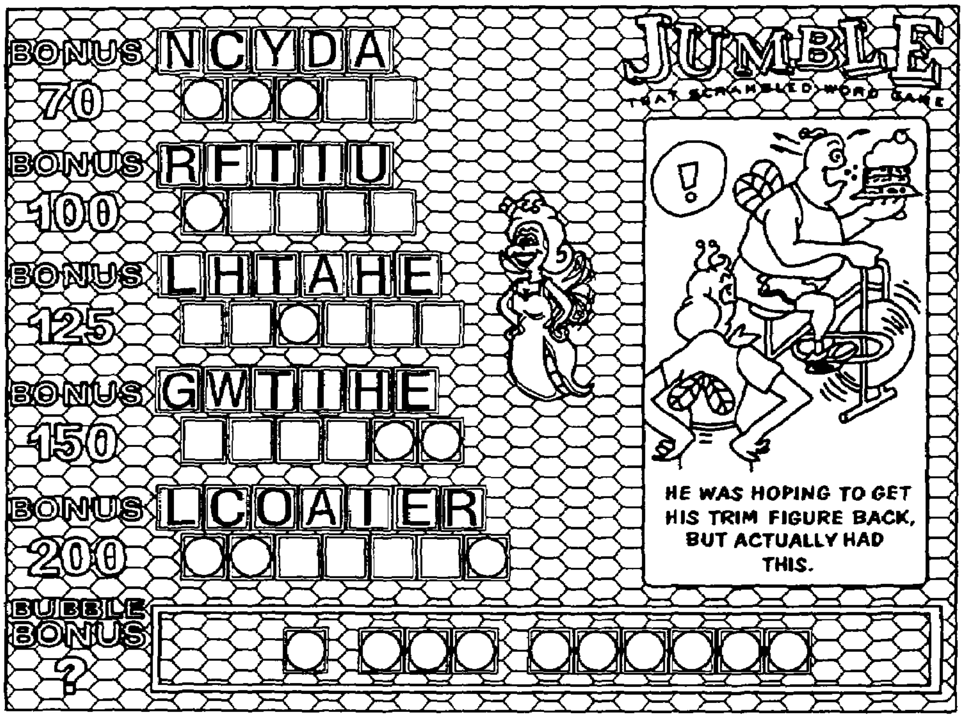
FIGS. 13, 14, 15, 16, 17, and 18 are display screen captures showing a pick-and-solve bonus game triggered by the start-bonus outcome in FIG. 12.
Figure 14:
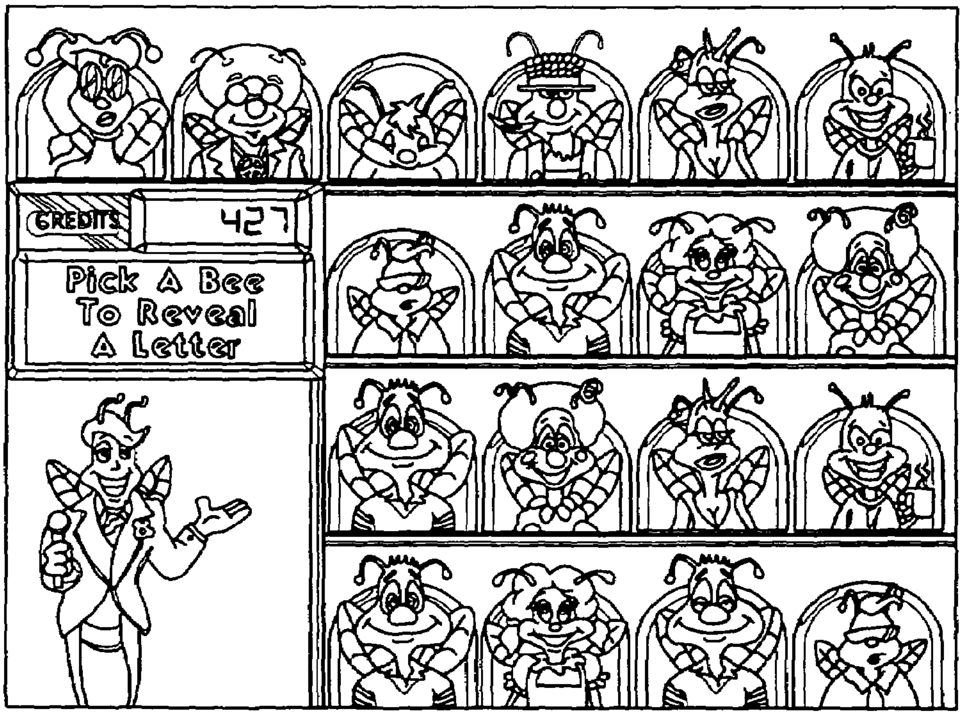

The pick-and-solve bonus game is triggered by the symbols JU, MB, and LE appearing horizontally on adjacent reels to spell JUMBLE. In FIG. 12, for example, the symbols JU, MB, and LE appear in the middle positions of the respective reels 31, 32, and 33. In response to this start-bonus outcome, the upper display 13 depicts a new JUMBLE puzzle (FIG. 13), and the lower display 12 depicts a game show setting with player-selectable audience members (FIG. 14). As illustrated in FIG. 13, the JUMBLE puzzle contains five scrambled words, a mystery Bubble Bonus phrase, and a related cartoon. The five scrambled words and the Bubble Bonus phrase are themed to go along with the cartoon. Each word in the five-word JUMBLE puzzle has a bonus, such as a payoff, associated with it. The payoff increases as the words get longer. When prompted, the player selects members of the bee audience depicted on the lower display 12. Each selected member reveals either a letter in the five-word JUMBLE puzzle or a Special Tile bonus.

Figure 15:
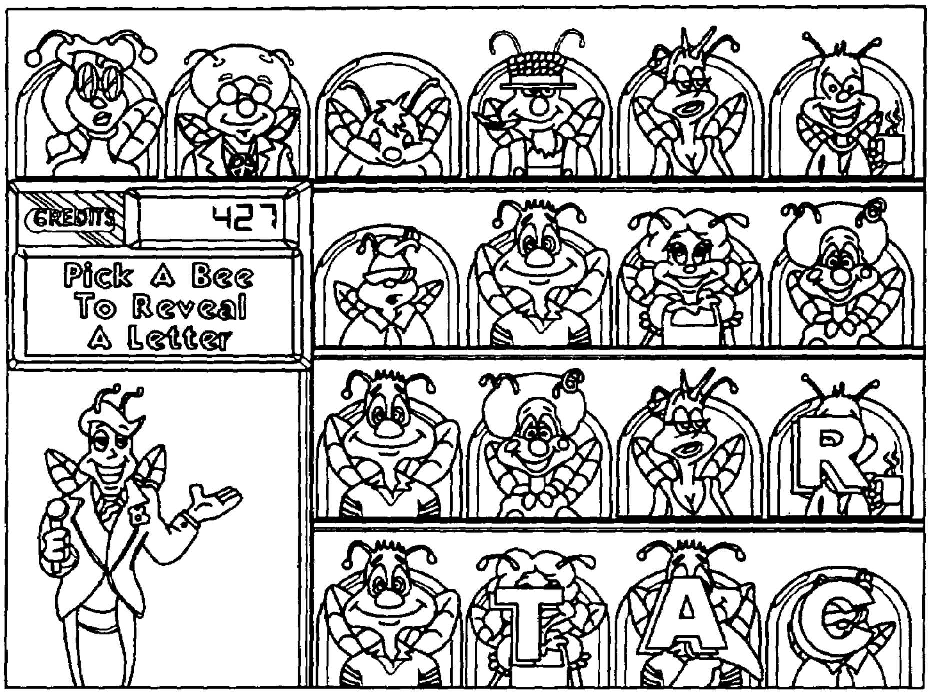
Figure 16:
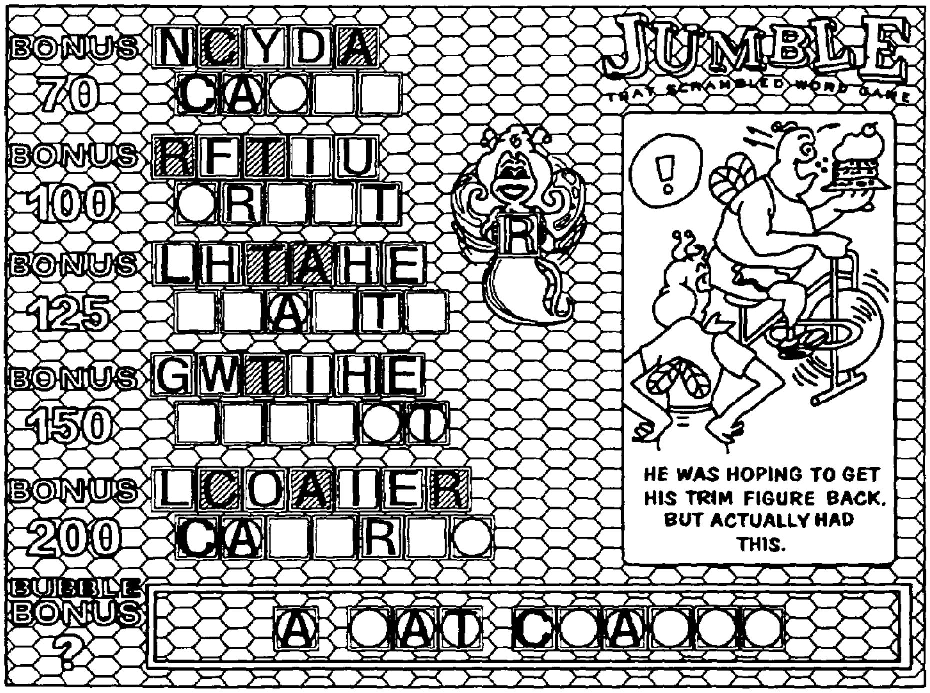
Figure 17:
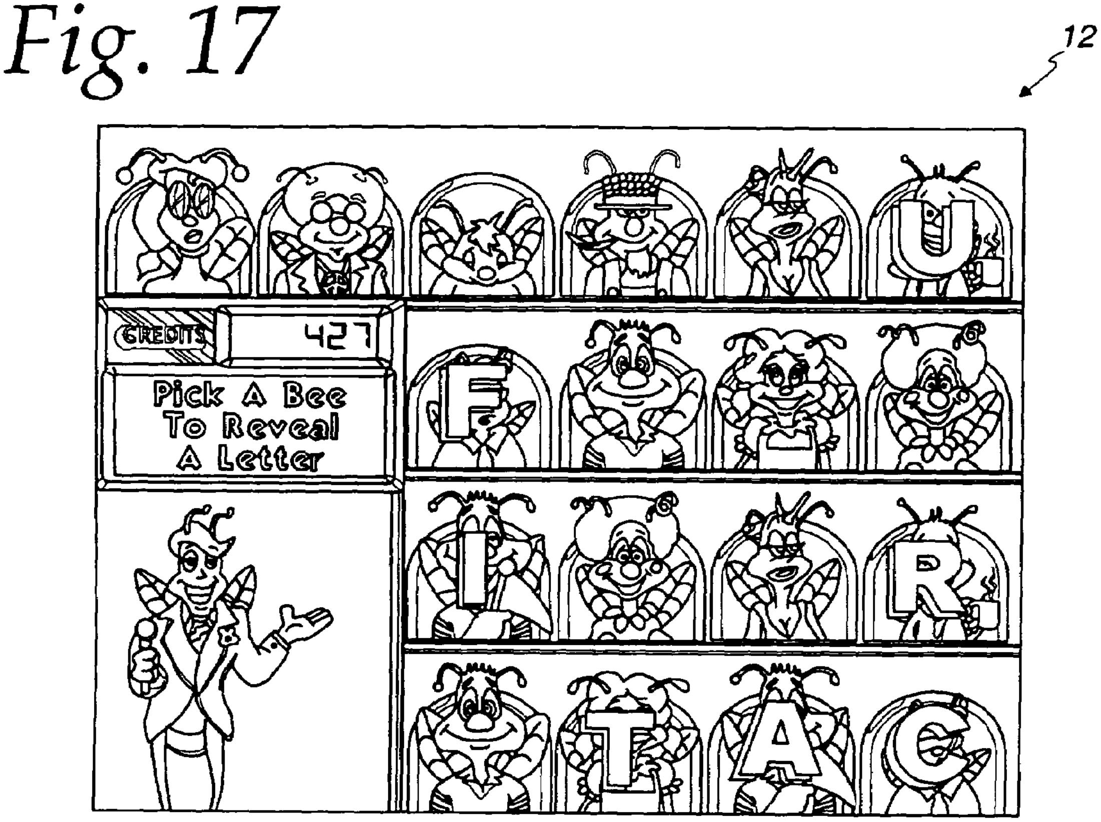
Figure 18:
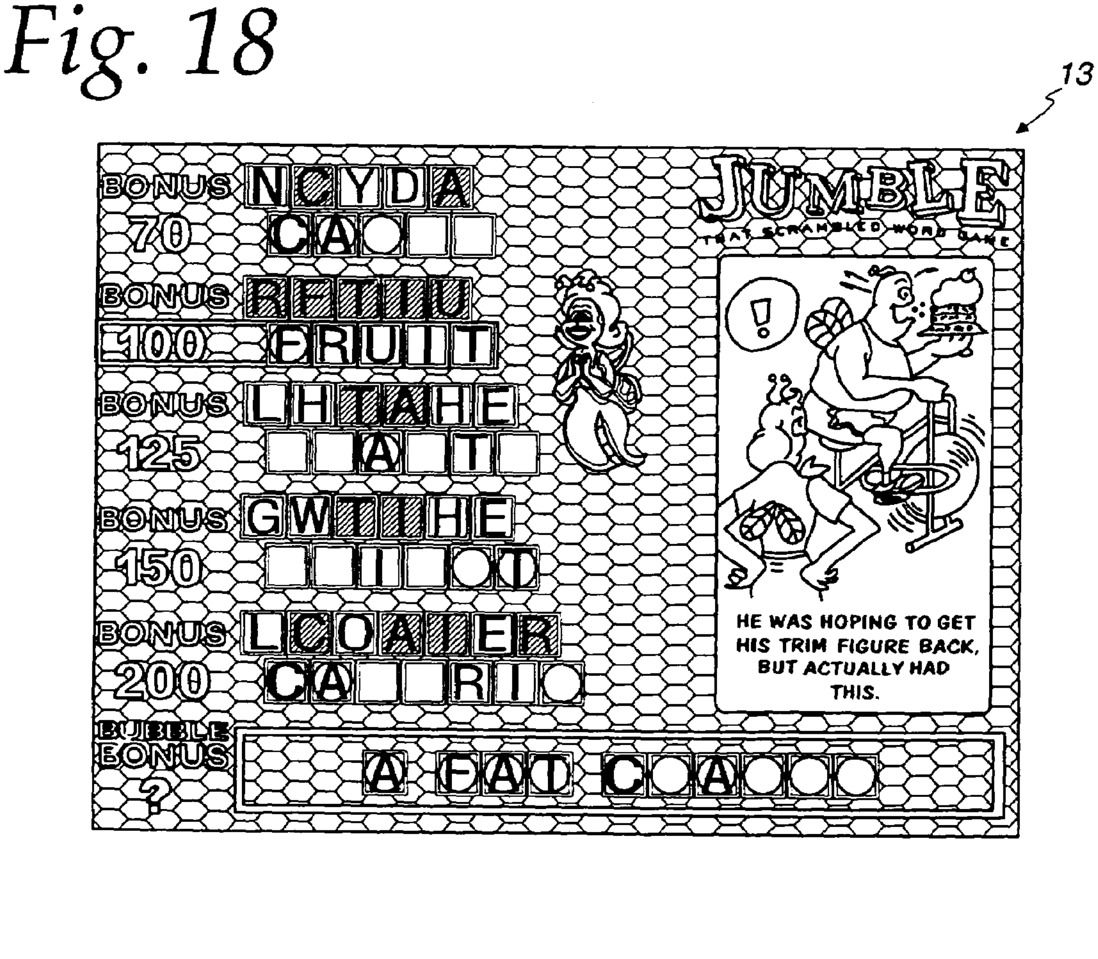

As letters are revealed, they appear in their correct positions in the words on the upper display 13. If a revealed letter belongs in more than one correct position in the JUMBLE puzzle, the letter is placed in all correct positions. When a letter is placed in a square with a bubble (circle) in it, the letter is also placed in its correct position in the Bubble Bonus phrase. In FIG. 15, for example, the selected audience members have revealed the letters R, T, A, and C. In FIG. 16, these revealed letters have been placed in their correct positions in the five words of the JUMBLE puzzle and, because the letters T, A, and C have been placed in squares with bubbles, the letters T, A, and C have also been placed in their correct positions in the Bubble Bonus phrase. Bonus play continues until one or more of the five scrambled words of the JUMBLE puzzle has been unscrambled, at which time the player is awarded the payoff associated with the unscrambled word(s) and the processor shifts operation back to the basic game. In FIG. 17, for example, continued selection of the audience members has revealed the letters U, F, and I. In FIG. 18, these revealed letters have unscrambled the second word FRUIT of the five-word JUMBLE puzzle to generate a bonus of 100 credits. If the Bubble Bonus Phrase is completed while selecting audience members and revealing their associated letters, a Bubble Bonus in the form of a payoff is awarded. The award of a Bubble Bonus preferably does not terminate the pick-and-solve bonus game; rather, as stated above, the pick-and-solve bonus game ends when one or more of the five scrambled words of the JUMBLE puzzle have been unscrambled. Following the completion of the pick-and-solve bonus game, the upper display 13 depicts the five words being used in the swap bonus game in the state they were in just prior to entering the pick-and-solve bonus game. Unlike the swap bonus game, changes in the JUMBLE puzzle (i.e., five words and Bubble Bonus phrase) produced by one round of the pick-and-solve bonus game are not carried over to subsequent rounds of the pick-and-solve bonus game. Instead, a new JUMBLE puzzle is depicted on the upper display 13 each time the pick-and-solve bonus game is triggered by the symbols JU, MB, and LE spelling JUMBLE horizontally across adjacent reels.

Occasionally, a selected member of the bee audience in the pick-and-solve bonus game reveals a special bonus, rather than a letter. The special bonus may, for example, be a Double Word bonus (doubles the award value of a single, random word), an instant Bubble Bonus (automatically awards the Bubble Bonus), or an Increase Award Values bonus (increases awards associated with different word levels).

While the present invention has been described with reference to one or more particular embodiments, those skilled in the art will recognize that many changes may be made thereto without departing from the spirit and scope of the present invention. For example, the basic game need not comprise a spinning reel slot machine game as illustrated in FIG. 1, but may comprise virtually any type of game of chance or skill or combination of games having outcomes (e.g., start-bonus outcomes) that trigger play of a bonus game on one or more displays. For example, the basic game may comprise a video poker or blackjack game. Also, the JUMBLE bonus games may be implemented as stand-alone basic games that are not triggered by start-bonus outcomes on spinning reels. Furthermore, the scrambled letters of the JUMBLE bonus games may be replaced with other types of scrambled objects, such as symbols, pictures, puzzle pieces, etc., which have a scrambled arrangement and a predetermined unscrambled (sorted) arrangement. The collection of scrambled objects may be displayed in a one-dimensional string, a two-dimensional array, or a three-dimensional array and, when fully sorted, may form a word, a picture, a shape, a geometrical sequence, etc. Each of these embodiments and obvious variations thereof is contemplated as falling within the spirit and scope of the claimed invention, which is set forth in the following claims.

What is claimed is:

1. A gaming machine, comprising:

a display configured to display a plurality of groups of objects and a plurality of player-selectable elements separate from said plurality of groups of objects, said plurality of player-selectable elements initially concealing indicia indicative of all of said objects within said plurality of groups of objects and at least one award modifier associated with at least one of said groups of objects, said indicia or said at least one award modifier being revealed upon selection of a corresponding player-selectable element, each of said groups of objects having a predetermined base payout associated therewith corresponding to a state wherein all indicia corresponding to a respective group have been revealed, said predetermined base payout being modifiable by any revealed award modifier associated with a respective one of said groups of objects;

an input device for receiving from a player selections of said player-selectable elements; and a processor communicatively coupled to said display and said input device, said processor being configured, responsive to a selection of a player-selectable element associated with a player input using said input device, to reveal an object associated with said selected player-selectable element and to render said selected player-selectable element subsequently un-selectable, and said processor being further configured to permit successive selections of said player-selectable elements until all indicia for one of said groups of objects are revealed and to award said predetermined base payout associated with said one of said plurality of groups whose objects have all been revealed, said predetermined base payout being modified by any revealed award modifier associated with said one of said plurality of groups.

2. The gaming machine of claim 1, wherein each of said plurality of player-selectable elements initially conceals indicia associated with one or more of said objects.

3. The gaming machine of claim 1, wherein said indicia includes a letter of the alphabet.

4. The gaming machine of claim 3, wherein said each of said objects is associated with a letter of the alphabet.

5. The gaming machine of claim 1, wherein said input device is a touch screen positioned over said display.

6. The gaming machine of claim 1, wherein each of said plurality of groups of objects is associated with a respective payout.

7. The gaming machine of claim 1, wherein said gaming machine conducts a basic game and a bonus game, said plurality of groups of objects and said plurality of player-selectable elements being associated with said bonus game.

8. The gaming machine of claim 1, wherein said indicia includes a letter of the alphabet and each of said groups of objects is a mixed group of letters of the alphabet that can be rearranged to form a word.

9. The gaming machine of claim 1, wherein said processor is located within said gaming machine.

10. The gaming machine of claim 1, wherein said at least one display includes two displays, one of said two displays for displaying said plurality of groups of objects, the other for displaying said plurality of player-selectable elements.

11. A gaming machine, comprising:

at least one display displaying a plurality of groups of objects and a plurality of player-selectable elements separate from said plurality of groups of objects, said plurality of player-selectable elements being simultaneously displayed in an array, said plurality of player-selectable elements initially concealing indicia corresponding to predetermined objects within said plurality of groups of objects, an input device for receiving from a player selections of said player-selectable elements from said displayed array of player-selectable elements; and a processor communicatively coupled to said display and said input device, said processor being configured, responsive to a selection of a player-selectable element associated with a player input using said input device, to reveal an object associated with said selected player-selectable element and to render said selected player-selectable element subsequently un-selectable, and said processor being further configured to permit selection of said player-selectable elements until all of said indicia in said plurality of player-selectable elements corresponding to said predetermined objects within one of said groups of objects are revealed and to award a payout associated with said one of said plurality of groups whose objects have all been revealed.

12. The gaming machine of claim 11, wherein each of said plurality of player-selectable elements initially conceals indicia associated with one or more of said objects.

13. The gaming machine of claim 12 , wherein said each of said objects is associated with a letter of the alphabet.

14. The gaming machine of claim 11, wherein said indicia includes a letter of the alphabet.

15. The gaming machine of claim 11, wherein said input device is a touch screen positioned over said display.

16. The gaming machine of claim 11, wherein each of said plurality of groups of objects is associated with a respective payout.

17. The gaming machine of claim 11, wherein said gaming machine conducts a basic game and a bonus game, said plurality of groups of objects and said plurality of player-selectable elements being associated with said bonus game.

18. The gaming machine of claim 11, wherein said indicia includes a letter of the alphabet and each of said groups of objects is a mixed group of letters of the alphabet that can be rearranged to form a word.

19. The gaming machine of claim 11, wherein said at least one display includes two displays, one of said two displays for displaying said plurality of groups of objects, the other for displaying said plurality of player-selectable elements.

20. A gaming machine configured to conduct a basic game and a bonus game, comprising:

at least one display displaying, in said bonus game, a plurality of groups of objects and a plurality of player-selectable elements separate from said plurality of groups of objects, said plurality of player-selectable elements initially concealing indicia corresponding to one or more predetermined objects within said plurality of groups of objects, each of said one or more predetermined objects having a predefined arrangement within a respective group or groups of said groups of objects;

an input device comprising a touch screen for receiving from a player sequential selections of said player-selectable elements; and a processor communicatively coupled to said display and said input device, said processor being configured, responsive to a selection of a player-selectable element associated with a player input using said input device, to reveal an object associated with said selected player-selectable element and to render said selected player-selectable element subsequently un-selectable, and said processor being further configured to permit selection of said player-selectable elements until all indicia for one of said groups of objects are revealed and to award a payout associated with said one of said plurality of groups whose objects have all been revealed.

21. A gaming machine configured to conduct a basic game and a bonus game, in accord with claim 20, wherein said bonus game comprises a pick-and-solve word puzzle.

22. A gaming machine configured to conduct a basic game and a bonus game, in accord with claim 20, wherein said plurality of player-selectable elements are displayed in an array on a first display and said plurality of groups of objects are displayed on a second display.

23. A gaming machine configured to conduct a basic game and a bonus game, in accord with claim 20, wherein said plurality of player-selectable elements are displayed in an array in a first portion of said display and said plurality of groups of objects are displayed on another portion of said display.

24. A method of conduct a wagering game, comprising:

displaying on a display a plurality of groups of objects and a plurality of player-selectable elements separate from said plurality of groups of objects, said plurality of player-selectable elements initially concealing outcomes associated with one or more predetermined objects within said plurality of groups of objects, each of said one or more predetermined objects having a predefined position within a respective group or groups of said groups of objects and a predefined association with one of said outcomes;

receiving a selection of a player-selectable element from a player;

revealing an outcome associated with the selected player-selectable element and associated with one or more predetermined objects within said plurality of groups of objects;

displaying said outcome in visual association with said one or more predetermined objects having said predefined position within said plurality of groups of objects;

repeating said acts of receiving, revealing and displaying until a group of objects is completed by revealing all outcomes associated with said objects within said group of objects; and awarding at least a base predetermined award for the completing of said group of objects.

* * * * *